United States Patent
Iwai et al.

(10) Patent No.: US 10,385,937 B2
(45) Date of Patent: Aug. 20, 2019

(54) DISC BRAKE CALIPER

(71) Applicant: Shimano Inc., Sakai, Osaka (JP)

(72) Inventors: Toru Iwai, Osaka (JP); Makoto Souwa, Osaka (JP); Yoshikazu Kashimoto, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/891,968

(22) Filed: Feb. 8, 2018

(65) Prior Publication Data

US 2018/0163801 A1 Jun. 14, 2018

Related U.S. Application Data

(63) Continuation of application No. 14/990,551, filed on Jan. 7, 2016, now Pat. No. 9,926,992.

(30) Foreign Application Priority Data

Feb. 24, 2015 (DE) .................. 10 2015 102 641
Dec. 29, 2015 (DE) .................. 10 2015 226 809

(51) Int. Cl.
| | | |
|---|---|---|
| *F16D 65/84* | (2006.01) | |
| *F16D 65/097* | (2006.01) | |
| *F16D 65/00* | (2006.01) | |
| *F16D 55/18* | (2006.01) | |
| *F16D 55/228* | (2006.01) | |
| *F16D 65/092* | (2006.01) | |
| *F16D 65/78* | (2006.01) | |

(52) U.S. Cl.
CPC ......... *F16D 65/0979* (2013.01); *F16D 55/18* (2013.01); *F16D 55/228* (2013.01); *F16D 65/0068* (2013.01); *F16D 65/092* (2013.01); *F16D 2065/789* (2013.01)

(58) Field of Classification Search
CPC .............. F16D 65/0979; F16C 65/0075; F16C 65/092; F16C 65/0971; F16C 65/847; B62L 3/00
USPC .............. 188/24.11–24.22, 26, 250 B, 250 G
See application file for complete search history.

(56) References Cited

U.S. PATENT DOCUMENTS

| | | |
|---|---|---|
| 3,277,985 A | 10/1966 | Caskey |
| 4,333,550 A | 6/1982 | Shirai |
| 5,841,042 A | 11/1998 | Kato |
| 6,557,671 B1 | 5/2003 | Kirimoto et al. |
| 8,210,329 B2 | 7/2012 | Demers |

(Continued)

FOREIGN PATENT DOCUMENTS

| | | |
|---|---|---|
| DE | 30 23 103 A1 | 1/1981 |
| DE | 697 10 696 T2 | 10/2002 |

(Continued)

*Primary Examiner* — Christopher P Schwartz
(74) *Attorney, Agent, or Firm* — Global IP Counselors, LLP (57) ABSTRACT

A disc brake caliper is basically provided with a caliper housing, a brake pad and an intermediate member. The caliper housing defines a slot that is configured to receive a brake rotor. The caliper housing is made of a first material. The brake pad includes a mounting plate. The brake pad is disposed in the slot. The intermediate member is disposed between the caliper housing and the brake pad. The intermediate member is made of a second material having a thermal conductivity that is smaller than a thermal conductivity of the first material.

10 Claims, 14 Drawing Sheets

(56) References Cited

U.S. PATENT DOCUMENTS

| | | | |
|---|---|---|---|
| 8,376,092 B2 | 2/2013 | Lethorn | |
| 8,439,171 B2 | 5/2013 | Kaneko et al. | |
| 8,464,848 B2 | 6/2013 | Wen | |
| 9,016,442 B2 | 4/2015 | Odaira et al. | |
| 2001/0030088 A1* | 10/2001 | Lumpkin | F16D 55/224 188/72.1 |
| 2004/0104086 A1 | 6/2004 | Katoh | |
| 2005/0269167 A1 | 12/2005 | Iwai et al. | |
| 2006/0266600 A1 | 11/2006 | Demers | |
| 2012/0000735 A1 | 1/2012 | Iwai et al. | |
| 2015/0129373 A1 | 5/2015 | Hirotomi et al. | |

FOREIGN PATENT DOCUMENTS

| | | |
|---|---|---|
| DE | 10 2011 000 547 A1 | 8/2012 |
| JP | 2001-336555 A | 12/2001 |
| JP | 2002-161931 A | 6/2002 |
| JP | 2004-270729 A | 9/2004 |

* cited by examiner

Rotational direction

DISC BRAKE CALIPER

CROSS-REFERENCE TO RELATED APPLICATIONS

This application is a continuation application of U.S. patent application Ser. No. 14/990,551 filed on Jan. 7, 2016. The entire disclosure of U.S. patent application Ser. No. 14/990,551 is hereby incorporated herein by reference. This application claims priority to German Patent Application No. DE 102015102641.4, filed on Feb. 24, 2015. The entire disclosure of German Patent Application No. DE 102015102641.4 is hereby incorporated herein by reference.

BACKGROUND

Field of the Invention

This invention generally relates to a disc brake caliper.

Background Information

Generally, there are several types of bicycle brake devices currently available on the market. Examples of some types of common bicycle brake devices include rim brakes, and disc brakes. Hydraulic disc brake systems provide substantial braking power in relation to the amount of braking force applied to the brake lever. Moreover, hydraulic disc brake systems typically provide a high level of braking consistency in all types of weather and riding conditions. However, one problem with disc brakes is that its performance is influenced by heat caused by braking.

SUMMARY

Generally, the present disclosure is directed to various features of a disc brake caliper.

An object of the present invention is to suppress heat transfer from the brake pad to the caliper housing.

In view of the state of the known technology and in accordance with a first aspect of the present invention, a disc brake caliper is provided that basically comprises a caliper housing, a brake pad, and an intermediate member. The caliper housing defines a slot that is configured to receive a brake rotor. The caliper housing is made of a first material. The brake pad includes a mounting plate. The brake pad is disposed in the slot. The intermediate member is disposed between the caliper housing and the brake pad. The intermediate member is made of a second material having a thermal conductivity that is smaller than a thermal conductivity of the first material.

According to this configuration, the intermediate member can suppress heat transfer from the brake pad to the caliper housing. Therefore, the intermediate member can keep consistent performance of the disc brake caliper.

Also other objects, features, aspects and advantages of the disclosed disc brake caliper will become apparent to those skilled in the art from the following detailed description, which, taken in conjunction with the annexed drawings, discloses illustrative embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
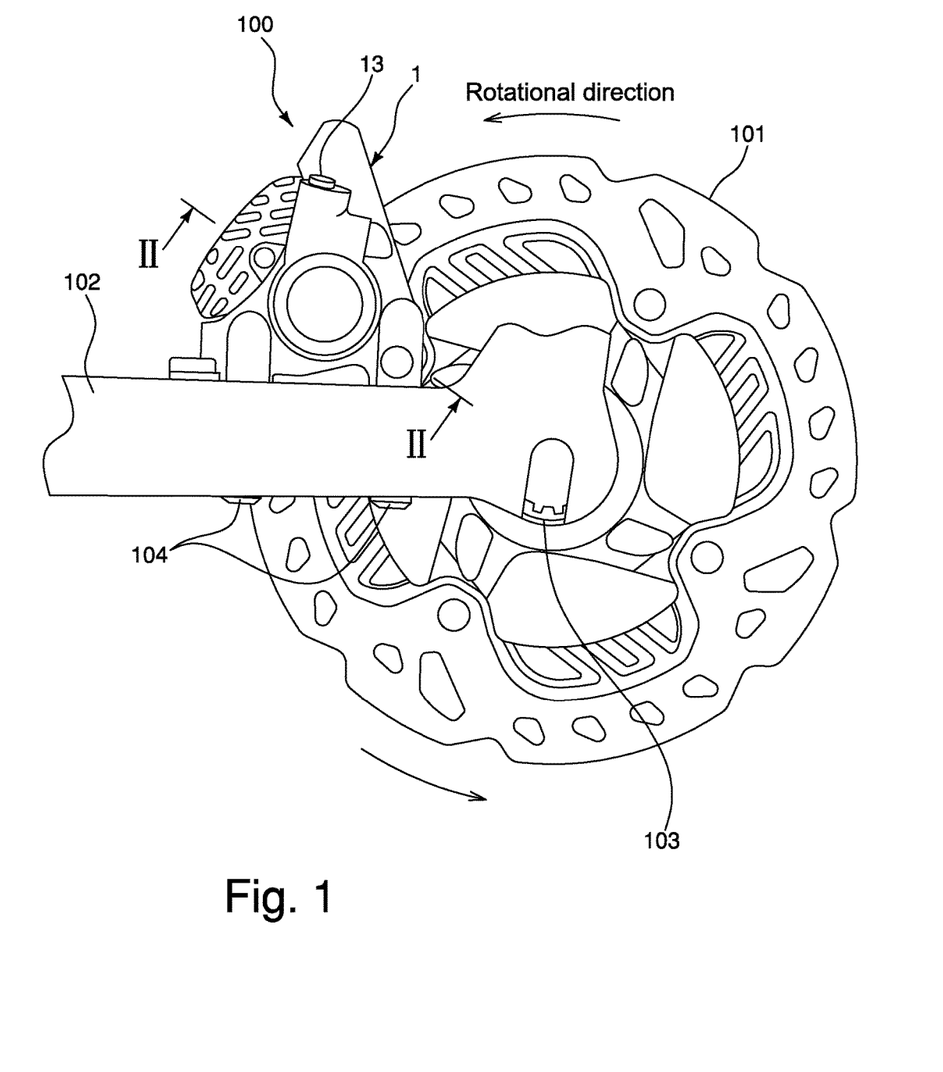
FIG. 1 is a side elevational view of a disc caliper in accordance with one illustrated embodiment in which the disc caliper is attached to a seat stay of a bicycle.

Referring initially to FIG. 1, a disc brake caliper 100 is illustrated in accordance with an illustrative embodiment. The disc brake caliper 100 is mounted to a portion of a bicycle to engage a brake rotor 101 in a conventional manner. In the illustrated embodiment, the disc brake caliper 100 is mounted on a bicycle frame 102 (i.e., a chain stay of the bicycle). The brake rotor 101 is attached to a hub 103 of a rear wheel (not shown) so that the brake rotor 101 rotates integrally with the rear wheel. In FIG. 1, the brake rotor 101 rotates when a bicycle moves forward. The disc brake caliper 100 applies a frictional force to the brake rotor 101.

Figure 2:
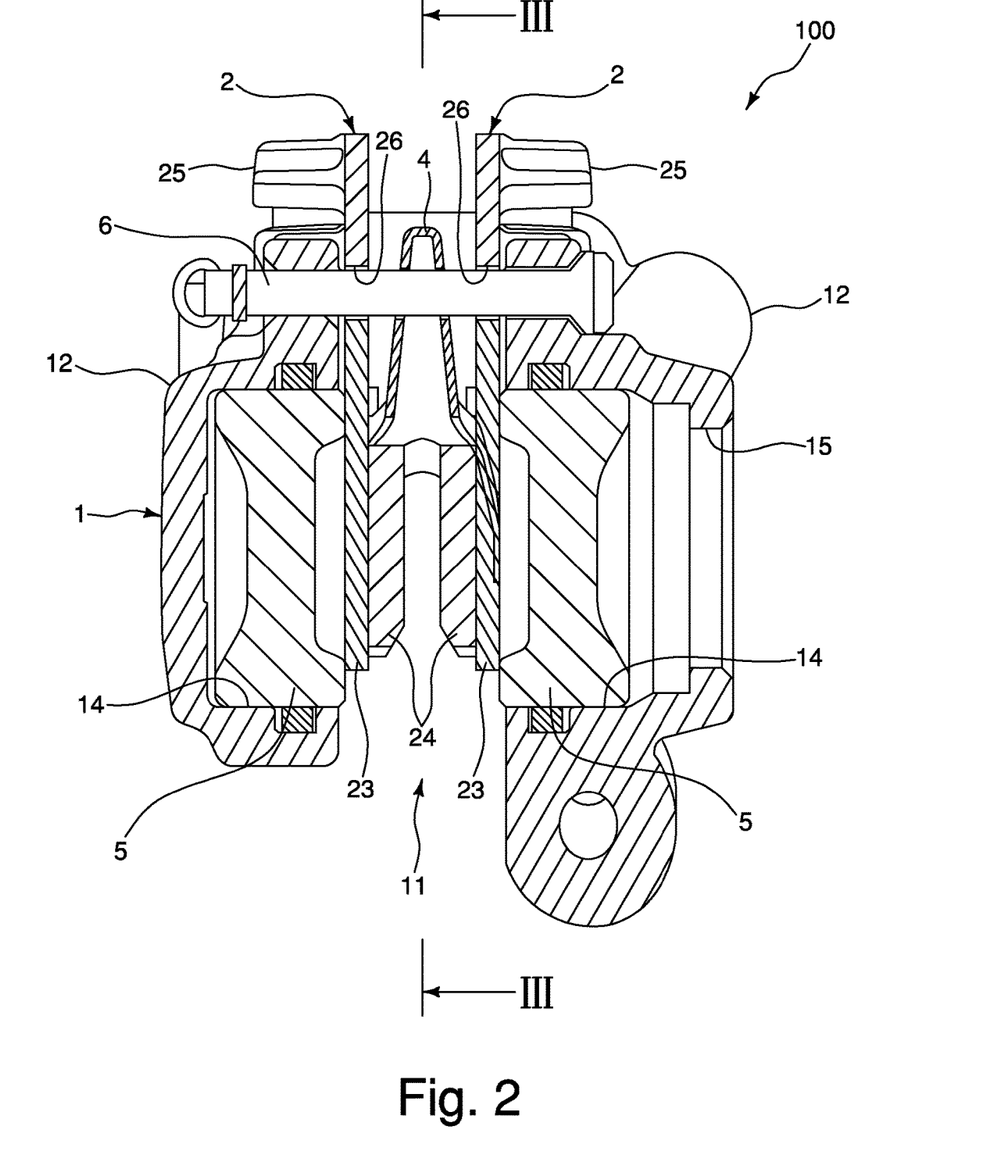
FIG. 2 is a cross-sectional view of the disc caliper illustrated in FIG. 1 taken along section line II-II in FIG. 1.
Figure 3:
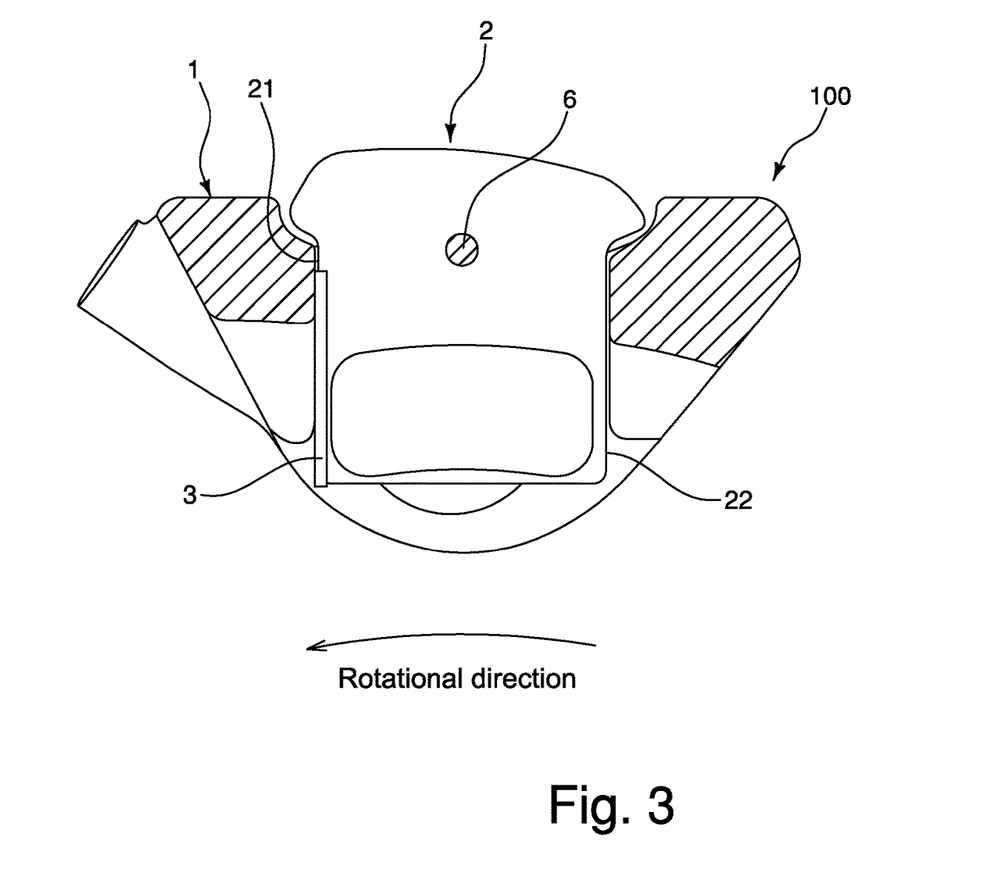
FIG. 3 is a cross-sectional view of the disc caliper illustrated in FIGS. 1 and 2 taken along line III-III in FIG. 2.

Referring to FIGS. 2 and 3, the disc brake caliper 100 is constructed as a part of a hydraulic brake system. In other words, the disc brake caliper 100 is a hydraulic disc brake caliper that is fluidly connected to a hydraulic brake lever (not shown) in a conventional manner. The disc brake caliper 100 comprises a caliper housing 1, a pair of brake pads 2 and a pair of intermediate members 3. The disc brake caliper 100 further comprises a biasing member 4, a pair of pistons 5 and a support pin 6. However, the arrangements used for limiting heat transfer from the brake pads 2 to the caliper housing 1, as discussed below, can be used in a mechanically (cable) operated disc brake caliper.

The caliper housing 1 defines a slot 11. The brake rotor 101 is arranged in the slot 11 when the caliper housing 1 and the brake rotor 101 are mounted to the bicycle. In the illustrated embodiment, the caliper housing 1 comprises a pair of housing members 12. The housing members 12 are attached together by bolts, or any other suitable configuration. The slot 11 is formed between the housing members 12 in the illustrated embodiment. Of course, the caliper housing 1 can be a one-piece member. In the illustrated embodiment, the caliper housing 1 is made of aluminum alloy. Also, the material of the caliper housing 1 is not limited to aluminum alloy.

As seen in FIG. 1, the caliper housing 1 is mounted to the bicycle frame 102 using a pair of fixing bolts 104 in a conventional manner. The caliper housing 1 also has a hydraulic inlet port 13. A cylinder plug (not shown) is inserted into an opening 15 of the caliper housing 1.

As seen in FIG. 2, the pistons 5 are movably mounted in the caliper housing 1 in a conventional manner. Specifically, the pistons 5 slidably fit into piston spaces 14 in the form of round cylinders formed in housing members 12 so as to move between a brake release position and a brake activating position. The pistons 5 are biased away from each other by the biasing member 4, which presses the brake pads 2 outwardly against the pistons 5. The pistons 5 are moved together due to the pressure of the hydraulic fluid acting on the pistons 5 as a result of a user squeezing the hydraulic brake lever that is fluidly connected to the caliper housing 1.

Figure 4:
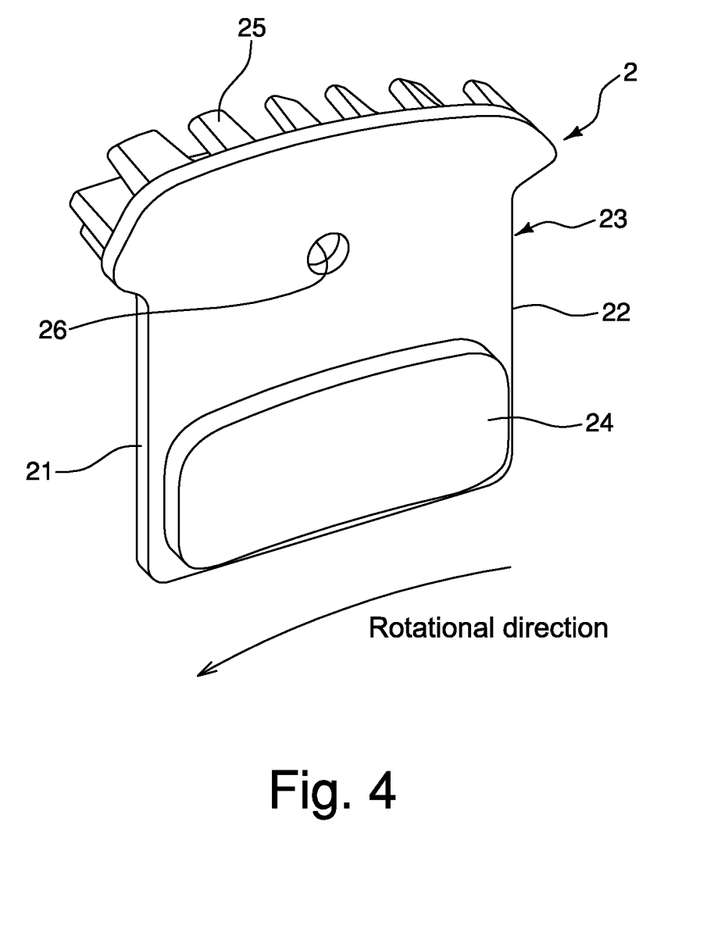
FIG. 4 is a perspective view of a brake pad used in the disc caliper illustrated in FIGS. 1 to 3.

The brake pads 2 are preferably disposed in the slot 11. The brake pads 2 face in different directions when installed on the support pin 6 as explained below. In the illustrated embodiment, each of the brake pads 2 has the intermediate member 3. The brake pads 2 are identical except that they are mirror images of each other. Thus, only one of the brake pads 2 and only one of the intermediate members 3 will be discussed and illustrated herein. As seen in FIG. 4, the brake pad 2 has a first peripheral end 21 and a second peripheral end 22. The first peripheral end 21 and the second peripheral end 22 are spaced apart in a rotational direction of the brake rotor 101. The first peripheral end 21 is disposed downstream with respect to the second peripheral end 22 in the rotational direction. In the brake activating position, the brake pads 2 contacts the brake rotor 101. The brake rotor 101 rotates in the rotational direction thus causing the brake pads 2 to move in a rotational direction. Therefore, the brake pads 2 swing around the support pin 6 so that the first peripheral end 21 moves close to the caliper housing 1 in the rotational direction.

Each of the brake pads 2 includes a mounting plate 23 and a friction member 24. The mounting plate 23 is made of aluminum alloy, for example. The first peripheral end 21 and the second peripheral end 22 is provided on the mounting plate 23. In other words, the mounting plate 23 has the first peripheral end 21 and the second peripheral end 22. The mounting plate 23 has a plurality of fins 25. The fins 25 are arranged outside the slot 11 in a state where the brake pads 2 are attached to the caliper housing 1. The mounting plate 23 has a pin mounting opening 26. The brake pads 2 are movably supported on the support pin 6, which extends through the pin mounting openings 26 in the brake pads 2. The support pin 6 extends between the housing members 12.

The friction member 24 is mounted on the mounting plate 23. Specifically, the friction member 24 is mounted on an opposite surface of the mounting plate 23 with respect to a surface having the fins 25. The friction member 24 includes metal. The friction member 24 is free of resin. For example, the friction member 24 is fixedly mounted on the mounting plate 23 by diffusion bonding or combustion synthesis.

Figure 5:
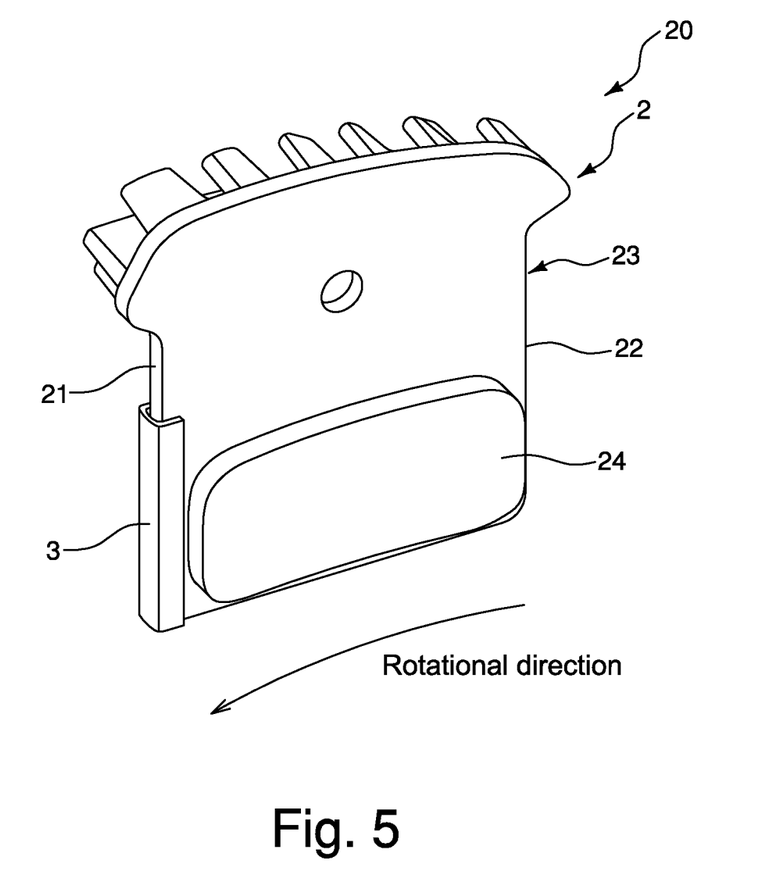
FIG. 5 is a perspective view of a brake pad assembly used in the disc caliper illustrated in FIGS. 1 to 3.

Referring to FIG. 3, the intermediate member 3 is disposed between the caliper housing 1 and the brake pad 2. Specifically, the intermediate member 3 is disposed between the caliper housing 1 and at least one of the first peripheral end 21 and the second peripheral end 22 of the brake pad 2. Preferably, the intermediate member 3 is disposed between the caliper housing 1 and the first peripheral end 21. As seen in FIG. 5, the intermediate member 3 is provided on the brake pad 2 so as to at least partially cover the first peripheral end 21. The intermediate member 3 can be attached to the brake pad 2 in a variety of ways. The intermediate member 3 and the brake pad 2 constitute a brake pad assembly 20. The intermediate member 3 can be attached to the brake pad 2 in a variety of ways. Here, the intermediate member 3 is deformed onto the mounting plate 23 to retain the intermediate member 3 on the mounting plate 23.

The intermediate member 3 is made of stainless steel, for example. The intermediate member 3 has smaller thermal conductivity than the mounting plate 23 to suppress heat transfer from the brake pads 2 to the caliper housing 1.

Figure 6:
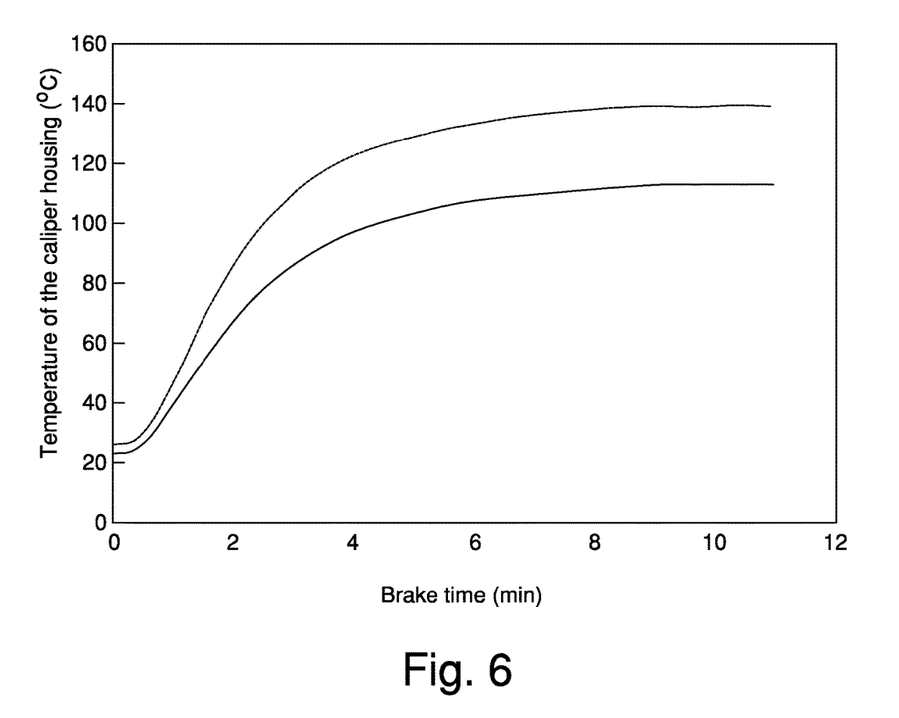
FIG. 6 is a graph showing the temperature of the caliper housing at different brake times.

FIG. 6 is a graph showing the temperature of the caliper housing at different brake times. Referring to FIG. 6, the solid line is related to the disc brake caliper 100 comprises the brake pads 2 with the intermediate members 3 made of stainless steel. The mounting plates 23 are made of aluminum alloy. Each of the friction members 24 include metal. On the other hand, the broken line is related a disc brake caliper comprises a brake pad without an intermediate member. Other structures are substantially same each other as the brake caliper 100. As it is clear from FIG. 6, the intermediate members 3 suppress heat transfer from the brake pads 2 to the caliper housing 1.

Figure 7:
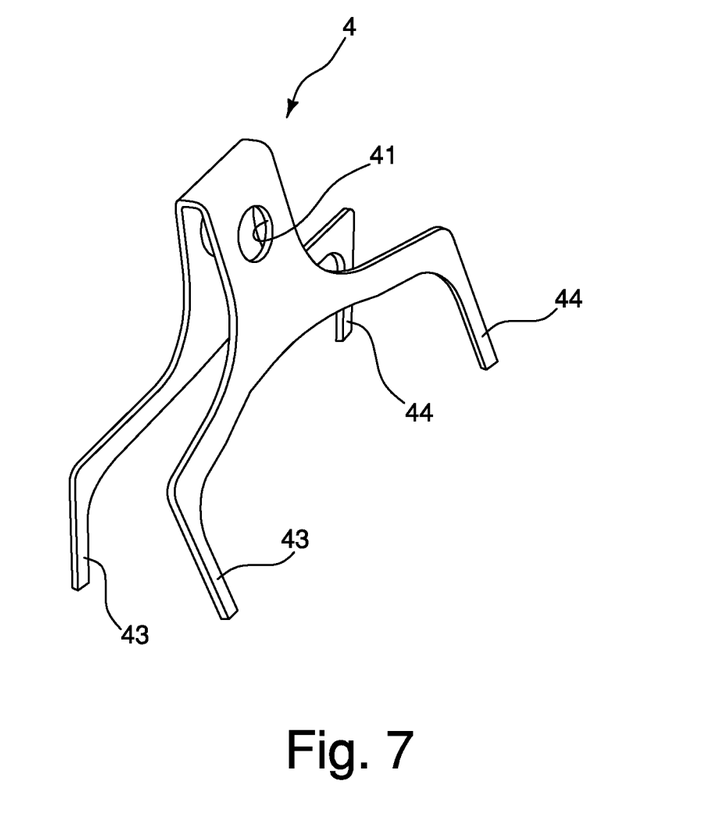
FIG. 7 is a perspective view of a biasing member used in the disc caliper illustrated in FIGS. 1 to 3.

Referring to FIG. 2, the biasing member 4 biases the brake pads 2 in a direction away from the brake rotor 101. In other words, the biasing member 4 biases the brake pads 2 so as to separate from each other. For example, the biasing member 4 is made of stainless steel. The biasing member 4 is disposed between the brake pads 2 for biasing the brake pads 2 out of engagement with the brake rotor 101 in a conventional manner. As seen in FIG. 7, the biasing member 4 has a pair of openings 41 for receiving the support pin 6. The biasing member 4 has a pair of first legs 43 and a pair of second legs 44. The first legs 43 extend along the first peripheral ends 21 in a state where the biasing member 4 is attached to the caliper housing 1. The second legs 44 extend along the second peripheral ends 22 in a state where the biasing member 4 is attached to the caliper housing 1. The friction members 24 are arranged between the first legs 43 and the second legs 44.

Figure 8:
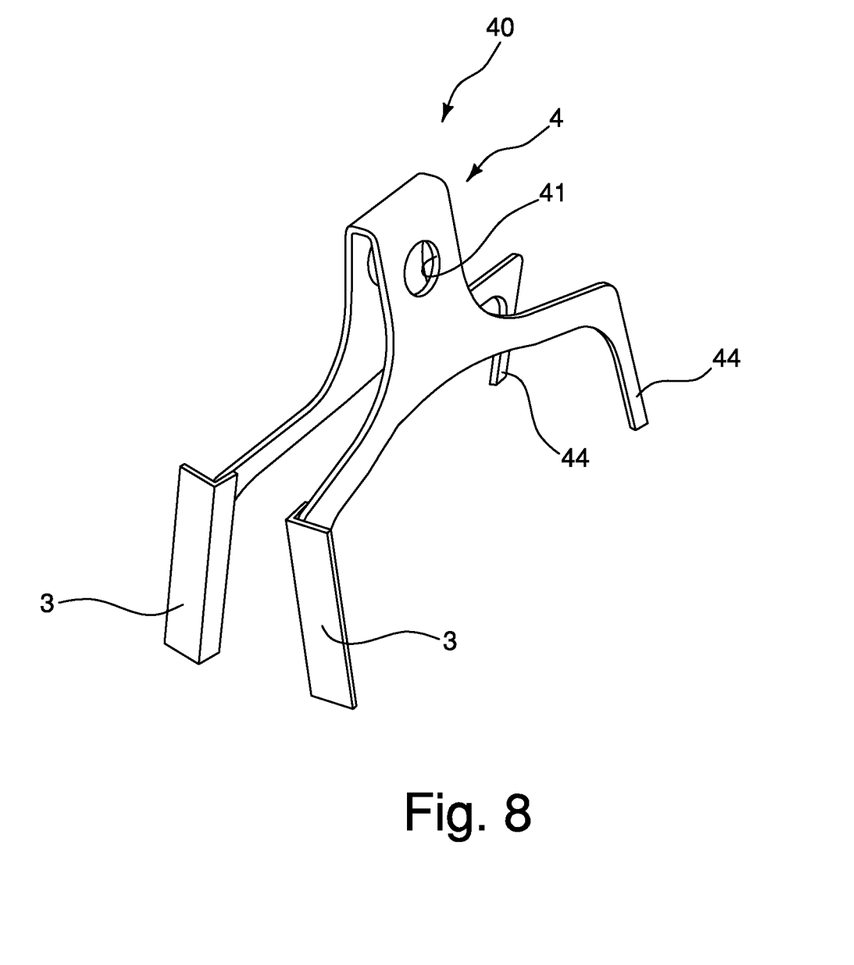
FIG. 8 is a perspective view of a biasing member assembly used in the disc caliper illustrated in FIGS. 1 to 3.
Figure 9:
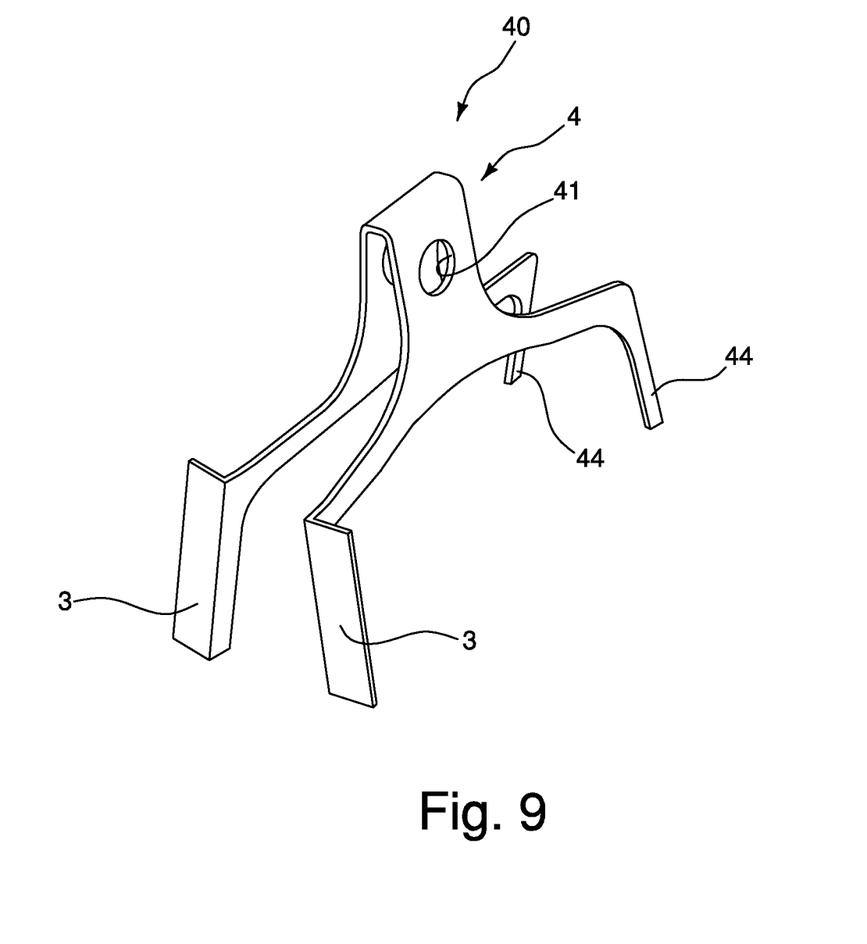
FIG. 9 is a perspective view of a modified biasing member assembly used in the disc caliper illustrated in FIGS. 1 to 3.
Figure 10:
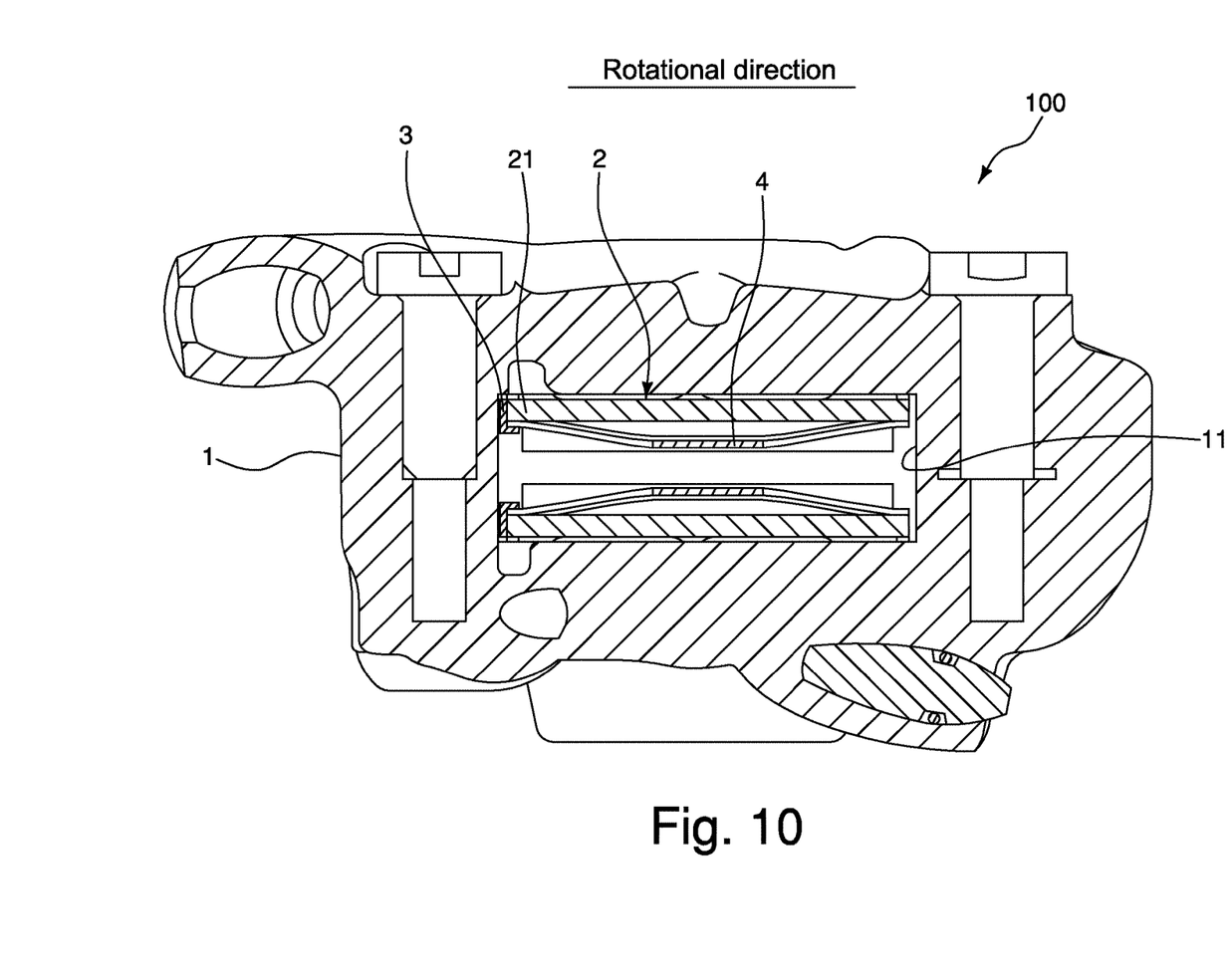
FIG. 10 is a cross-sectional view of the disc caliper illustrated in FIGS. 1 to 3.

In some embodiments, the intermediate members 3 are provided on the biasing member 4. As seen in FIG. 8, the intermediate members 3 are provided on the first legs 43. As seen in FIG. 9, the intermediate members 3 and the biasing member 4 can be integrally formed as a unitary one-piece member. As seen in FIG. 10, the intermediate members 3 are disposed between the caliper housing 1 and the brake pads 2. Specifically, the intermediate members 3 are disposed between the caliper housing 1 and the first peripheral ends 21 of the brake pads 2. The intermediate members 3 and the biasing member 4 constitute a biasing member assembly 40.

The intermediate members 3 can be also disposed between the caliper housing 1 and the second peripheral ends 22 of the brake pads 2.

Referring to FIGS. 11 to 14, a modified brake pad 2' is illustrated having a modified intermediate member 3'. The intermediate member 3' and the brake pad 2' constitute a modified brake pad assembly 20'. Two of the modified brake pad assemblies 20' can be used in the disc brake caliper 100 illustrated in FIGS. 1 to 3. Thus, the following description of the modified brake pads 2' will describe as being used with the disc brake caliper 100 illustrated in FIGS. 1 to 3.

Figure 11:
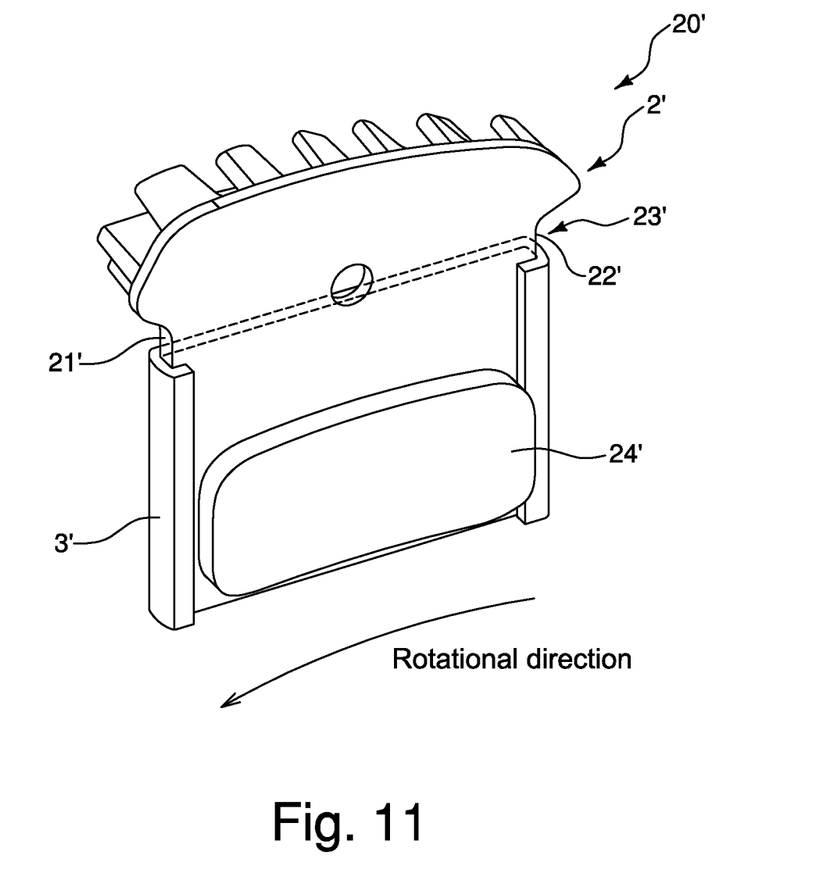
FIG. 11 is a perspective view of a modified brake pad assembly that is used in the disc caliper illustrated in FIGS. 1 to 3.

Each of the modified brake pad 2' has a first peripheral end 21' and the second peripheral end 22'. Each of the modified brake pad 2' includes a mounting plate 23' and a friction member 24'. The mounting plate 23' is made of aluminum alloy, for example. The first and second peripheral ends 21' and 22' are provided on the mounting plate 23'. The first peripheral end 21' and the second peripheral end 22' are provided on the mounting plate 23'. In other words, the mounting plate 23' has the first peripheral end 21' and the second peripheral end 22'. The mounting plate 23' has a plurality of fins 25'. The fins 25' are arranged outside the slot 11 in a state where the modified brake pads 2' are attached to the caliper housing 1. The mounting plate 23' has a pin mounting opening 26'. The modified brake pads 2' are movably supported on the support pin 6, which extends through the pin mounting openings 26' in the modified brake pads 2'. The support pin 6 extends between the housing members 12.

The friction member 24' is mounted on the mounting plate 23'. Specifically, the friction member 24' is mounted on an opposite surface of the mounting plate 23' with respect to a first surface 27' that has the fins 25'. Thus, the mounting plate 23' has the first surface 27' extending between the first and second peripheral ends 21' and 22'. The friction member 24' includes metal. The friction member 24' is free of resin. For example, the friction member 24' is fixedly mounted on the mounting plate 23' by diffusion bonding or combustion synthesis.

Figure 12:
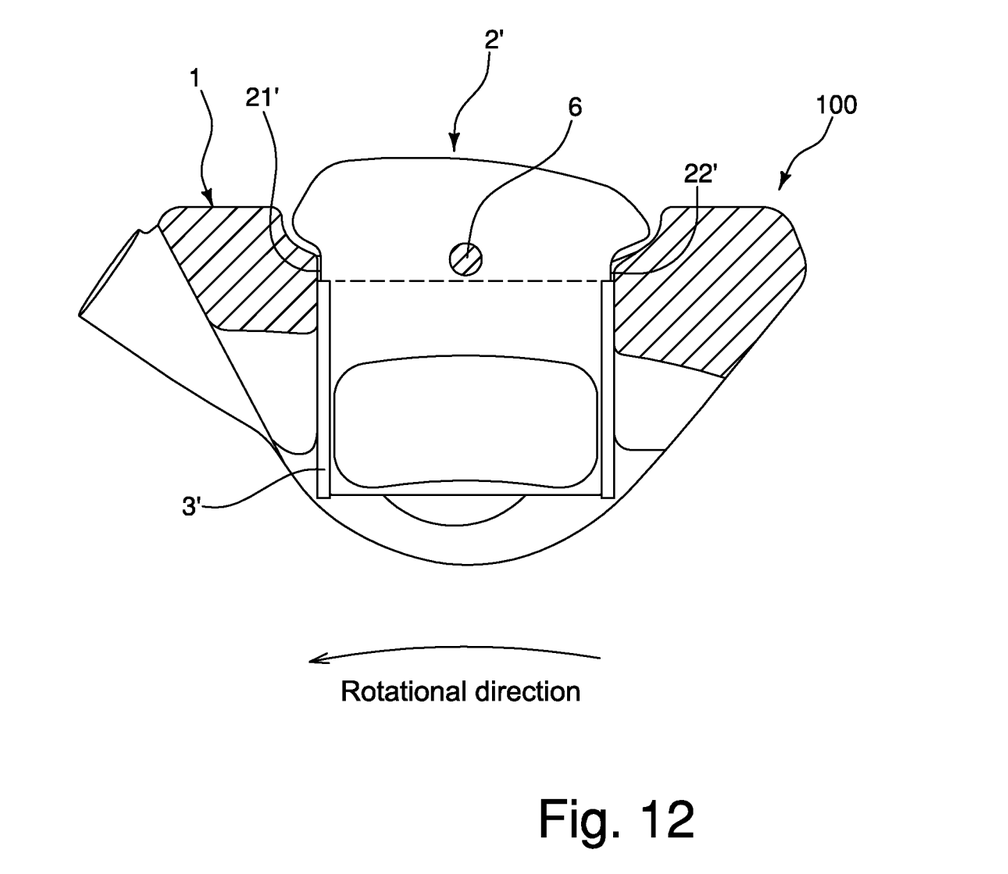
FIG. 12 is a cross-sectional view, similar to FIG. 3, of the disc caliper illustrated in FIGS. 1 and 2, but with the modified brake pad assembly of FIG. 11 installed in the disc caliper.
Figure 13:
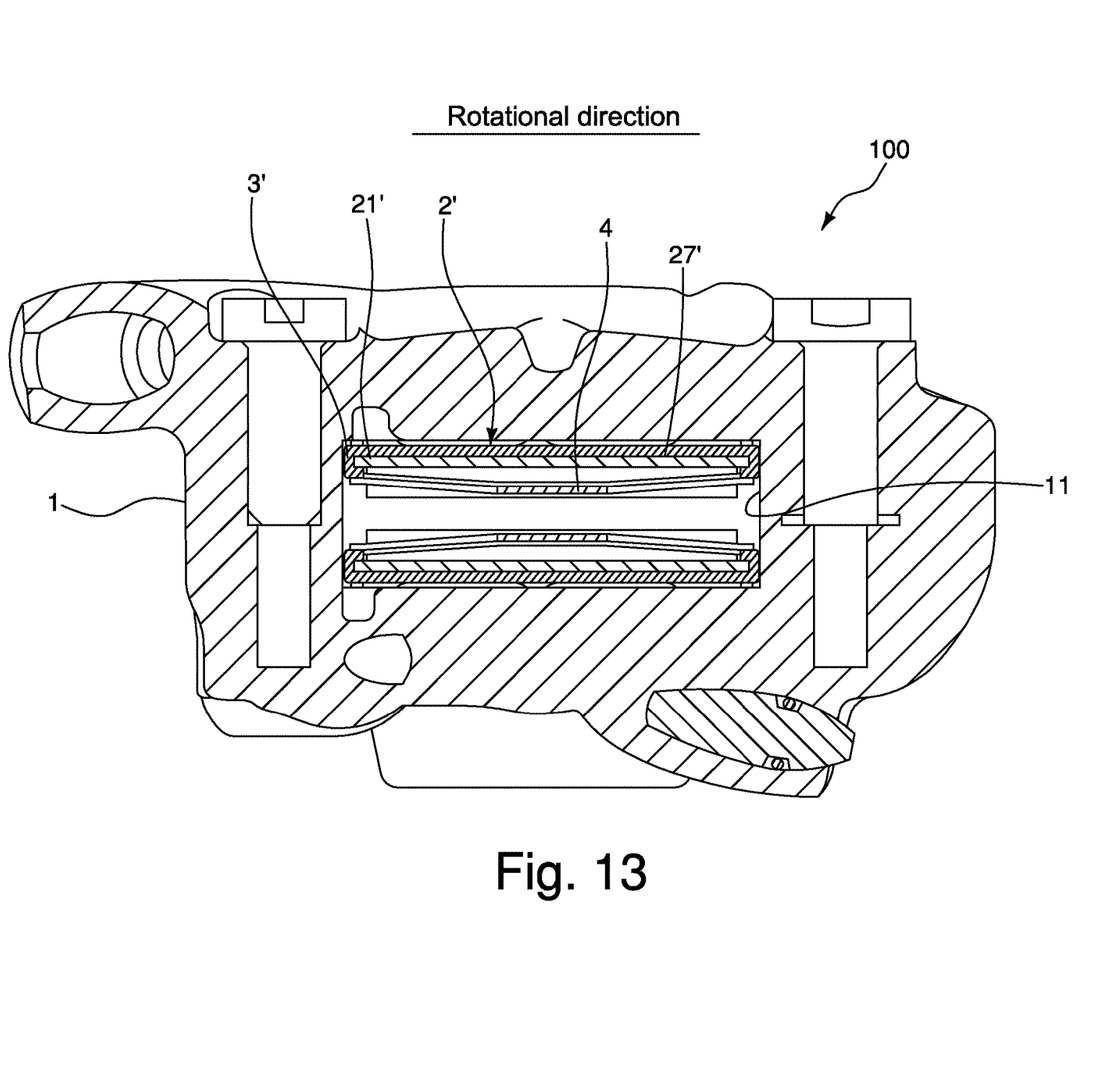
FIG. 13 is a cross-sectional view, similar to FIG. 10, of the disc caliper illustrated in FIGS. 1 and 2, but with the modified brake pad assembly of FIG. 11 installed in the disc caliper.
Figure 14:
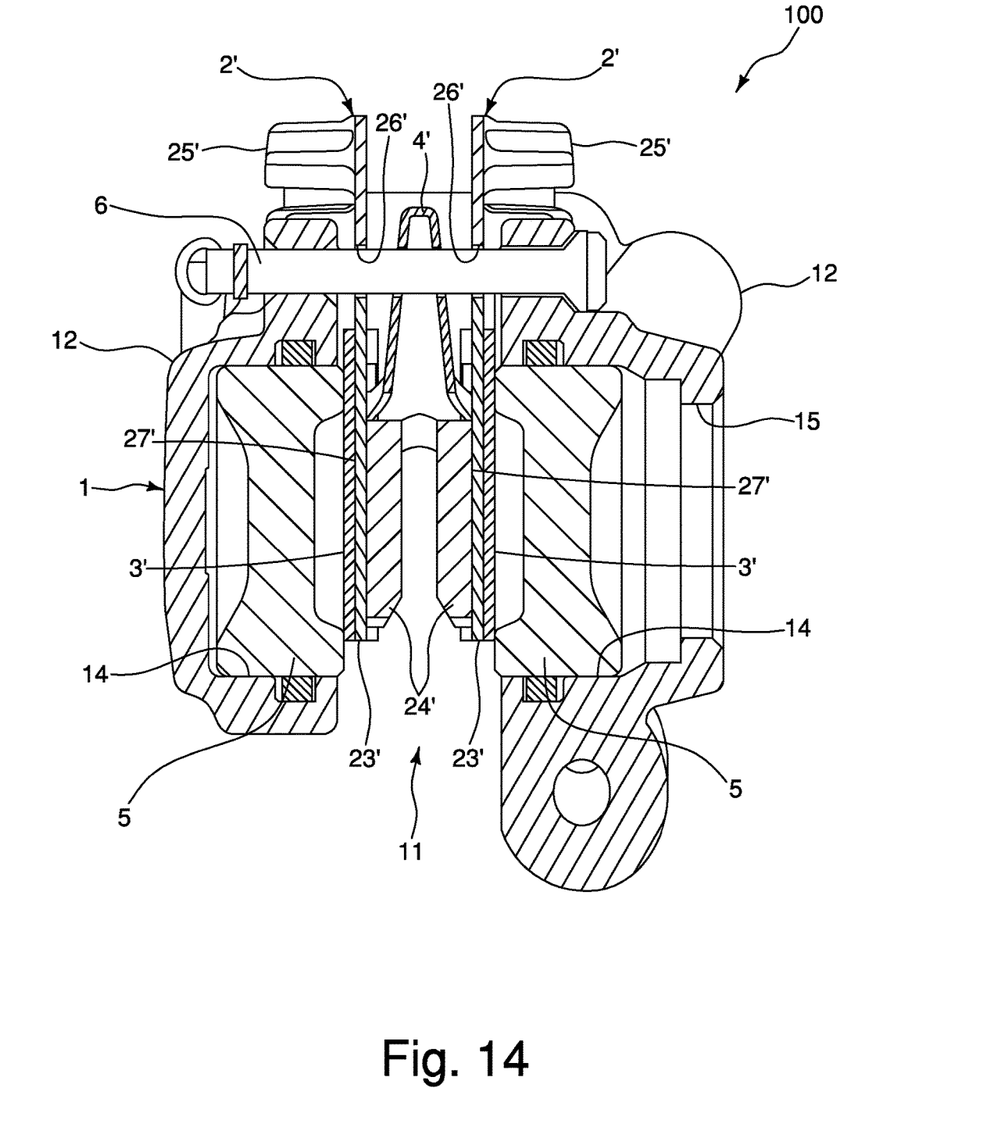
FIG. 14 is a cross-sectional view, similar to FIG. 2, of the disc caliper illustrated in FIGS. 1 and 2, but with the modified brake pad assembly of FIG. 11 installed in the disc caliper.

Referring to FIGS. 12 and 13, the intermediate member 3' is disposed between the caliper housing 1 and the brake pad 2'. Specifically, the intermediate member 3' is disposed between the caliper housing 1' and each of the first peripheral end 21', the second peripheral end 22' and the first surface 27' of the brake pad 2'. As seen in FIGS. 12 and 13, the intermediate member 3' is provided on the brake pad 2' so as to at least partially cover the first peripheral end 21', the second peripheral end 22' and the first surface 27' of the brake pad 2'. The intermediate member 3' can be attached to the brake pad 2 in a variety of ways. Here, the intermediate member 3' is deformed onto the mounting plate 23' to retain the intermediate member 3' on the mounting plate 23'.

The intermediate member 3' is made of stainless steel, for example. The intermediate member 3' has smaller thermal conductivity than the mounting plate 23' to suppress heat transfer from the brake pads 2' to the caliper housing 1. With this configuration of the intermediate member 3' overlying the first surface 27' of the mounting plate 23', the thickness of the mounting plate 23' can be decreased by the thickness of the intermediate member 3'. Here, the thickness of the mounting plate 23' has been reduced in half as compared to the thickness of the mounting plate 23 of the prior embodiment in that the thickness of the mounting plate 23' is equal to the thickness of the intermediate member 3'. Thus, the overall thickness of the modified brake pad assembly 20' is the same as the overall thickness of the brake pad assembly 20 of the prior embodiment.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean an amount of deviation of the modified term such that the end result is not significantly changed.

While selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected to or contacting each other can have intermediate structures disposed between them. The functions of one element can be performed by two elements, and vice versa. The structures and functions of one embodiment can be adopted in another embodiment. Thus, it is not necessary for all advantages to be present in a particular embodiment at the same time. Every feature which is unique from the prior art, alone or in combination with other features, also should be considered a separate description of further embodiments by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A disc brake caliper comprising:
a caliper housing defining a slot configured to receive a brake rotor, the caliper housing being made of a first material;
a brake pad including a mounting plate, the brake pad being disposed in the slot;
an intermediate member disposed between the caliper housing and the brake pad, the intermediate member being made of a second material having a thermal conductivity that is smaller than a thermal conductivity of the first material;
an additional brake pad disposed in the slot of the caliper housing; and
an additional intermediate member disposed between the caliper housing and the additional brake pad,
the brake pad having a first peripheral end and a second peripheral end arranged in a rotational direction of the brake rotor, the first peripheral end being disposed downstream with respect to the second peripheral end in the rotational direction, and
the intermediate member being disposed between the caliper housing and the first peripheral end of the brake pad,
the additional brake pad having a first peripheral end and a second peripheral end arranged in a rotational direction of the brake rotor, the first peripheral end being disposed downstream with respect to the second peripheral end in the rotational direction, and
the additional intermediate member being disposed between the caliper housing and the first peripheral end of the additional brake pad,
the intermediate member and the additional intermediate member being connected together by a connecting part, the connecting part extending radially outward from the intermediate member and the additional intermediate member in a radial direction of the brake rotor.

2. The disc brake caliper according to claim 1, wherein the first material is aluminum alloy.

3. The disc brake caliper according to claim 1, wherein the second material is stainless steel.

4. The disc brake caliper according to claim 1, wherein the mounting plate is made of a third material having a thermal conductivity that is higher than a thermal conductivity of the second material.

5. The disc brake caliper according to claim 4, wherein the third material is aluminum alloy.

6. The disc brake caliper according to claim 1, wherein the connecting part includes an opening disposed in a position farther outward in the radial direction than the intermediate member and the additional intermediate member.

7. The disc brake caliper according to claim 6, further comprising
the opening is configured and arranged to receive a support pin that movably supports the brake pads.

8. The disc brake caliper according to claim 1,
wherein the first and second peripheral ends are provided on the mounting plate.

9. The disc brake caliper according to claim 1, wherein the intermediate member, the additional intermediate member, and the connecting part are provided as a one-piece unitary member.

10. The disc brake caliper according to claim 1, wherein the connecting part is a biasing member.

\* \* \* \* \*